(12) United States Patent
Kim

(10) Patent No.: US 8,049,832 B2
(45) Date of Patent: Nov. 1, 2011

(54) LIQUID CRYSTAL DISPLAY DEVICE

(75) Inventor: Jae-Lyang Kim, Paju Si (KR)

(73) Assignee: LG Display Co., Ltd., Seoul (KR)

( * ) Notice: Subject to any disclaimer, the term of this patent is extended or adjusted under 35 U.S.C. 154(b) by 185 days.

(21) Appl. No.: 12/343,050

(22) Filed: Dec. 23, 2008

(65) Prior Publication Data
US 2009/0251632 A1 Oct. 8, 2009

(30) Foreign Application Priority Data

Apr. 7, 2008 (KR) .................. 10-2008-0032344

(51) Int. Cl.
*G02F 1/1339* (2006.01)
(52) U.S. Cl. ........................................ 349/58
(58) Field of Classification Search .............. 349/58
See application file for complete search history.

(56) References Cited

U.S. PATENT DOCUMENTS

| | | | |
|---|---|---|---|
| 2006/0290833 A1* | 12/2006 | Park | 349/58 |
| 2007/0008449 A1* | 1/2007 | Choi | 349/58 |

FOREIGN PATENT DOCUMENTS

CN 200969237 Y 10/2007

OTHER PUBLICATIONS

Office Action issued in corresponding Chinese Patent Application No. 200810186587.4; issued Apr. 29, 2010.

* cited by examiner

*Primary Examiner* — Phu Vu
(74) *Attorney, Agent, or Firm* — Brinks Hofer Gilson & Lione

(57) ABSTRACT

Disclosed is an LCD device having a division-type upper cover provided with male and female coupling means to provide a structural basis for assembly at four corners, and to attenuate distortion of the LCD device. The liquid crystal display (LCD) device comprises: a main support having a rectangular shape with an opened middle portion; an LC panel laminated on the main support; and an upper cover divided into a plurality of parts, and coupled to the main support and the LC panel in correspondence to long and short edges of the LC panel, wherein the upper cover consists of a main frame coupled to edges of the LC panel and an upper surface of the main support, and a side frame coupled to side surfaces of the main support, wherein the upper cover is provided with coupling means adjacently formed at corners of the main support, and serving to couple the main support to the main frame.

4 Claims, 4 Drawing Sheets

LIQUID CRYSTAL DISPLAY DEVICE

RELATED APPLICATIONS

The present invention relates to subject matter contained in priority Korean Application 10-2008-0032344, filed Apr. 7, 2008, which is herein expressly incorporated by reference in its entirety.

BACKGROUND

1. Field of the Disclosure

The present invention relates to a liquid crystal display (LCD) device, and more particularly, to an LCD device including a division-type upper cover having male and female coupling means at four corners, the male and female coupling means serving to provide a structural basis for assembly and to attenuate distortion of the LCD device.

2. Description of the Background Art

Generally, flat type display devices have been continuously developed as media to transmit visual information since the beginning of the 21$^{th}$ century. Among the various flat type display devices, liquid crystal display (LCD) devices are being spotlighted as the next cathode ray tube (CRT). In an LCD device, data signals are individually supplied to pixels arranged in matrixes according to image information, and optical transmittance of each pixel is controlled, thereby displaying a desired image.

However, the LCD device cannot spontaneously emit light therefrom, thereby requiring a backlight to additionally provide light for displaying an image. The backlight may have various types, but they may be largely divided into an edge type and a direct type according to the structure of the lamp that is installed in the backlight. An edge type indicates a backlight provided with one lamp at one side, or a backlight provided with two lamps at both sides. On the other hand, a direct type indicates a backlight having a plurality of lamps therebelow. Here, the lamp may include a cold Cathode Fluorescent Lamp (CCFL), or an External Electrode Fluorescent Lamp (EEFL).

FIG. 1 is an exploded perspective view showing a direct type LCD device in accordance with the conventional art.

As shown in FIG. 1, a reflection plate 12 for reflecting light supplied from a plurality of lamps 20 to a front surface of a liquid crystal (LC) panel 50 is attached onto a lower cover 10. The plurality of lamps 20 are fixed onto the reflection plate 12 by a fixing member, side supports 30. Although not shown, a rubber holder for protecting soldering parts of the two lamps 20 is formed at electrodes disposed at both sides of the lamps 20. The rubber holder is mounted in the side supports 30, and is fixed onto the lower cover 10.

A diffusion plate 35 for uniformly and forwardly distributing light reflected through the reflection plate 12 and an optical sheet 36 for complementing an optical characteristic of light passing through the diffusion plate 140 are provided. The optical sheet 36 includes a prism sheet for enhancing a frontal brightness of light passing through the diffusion plate 35 and a protection sheet disposed above the prism sheet for protecting the prism sheet from external scratch, etc.

A main support 40 for balancing an entire force of the LCD device is laminated on the optical sheet 36. Here, the main support 40 is formed to have a stepped portion on an upper surface thereof with consideration of the LC panel 50 to be laminated thereon.

The LC panel 50 laminated on the main support 40 is formed by undergoing many unit processes. That is, the LC panel 50 includes an array substrate; a switching device having a thin film transistor at each unit pixel; a color filter substrate having a color filter that represents colors; and an LC injected between the two substrates.

The upper cover 60 that covers an outer periphery of the LC panel 50 and side surfaces of the main support 40 is coupled to the lower cover 10 by an additional coupling means such as a hook.

As the LCD device becomes larger, all components of the LCD device also have to become larger, which creates problems. When the upper cover implemented as a metallic pattern is to be integrally fabricated, an entire frame having a rectangular shape is formed. Then, the frame undergoes a cutting process so that a central portion thereof can be opened. This may cause materials to be considerably wasted.

BRIEF SUMMARY

A liquid crystal display (LCD) device comprises a main support having a rectangular shape with an opened middle portion; an LC panel laminated on the main support; and an upper cover divided into a plurality of parts, and coupled to the main support and the LC panel in correspondence to long and short edges of the LC panel, wherein the upper cover consists of a main frame coupled to edges of the LC panel and an upper surface of the main support, and a side frame coupled to side surfaces of the main support, wherein the upper cover is provided with coupling means adjacently formed at corners of the main support, and serving to couple the main support to the main frame.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to the preferred embodiments of the present invention, examples of which are illustrated in the accompanying drawings.

Hereinafter, a liquid crystal display (LCD) device according to the present invention will be explained in more detail.

Figure 1:
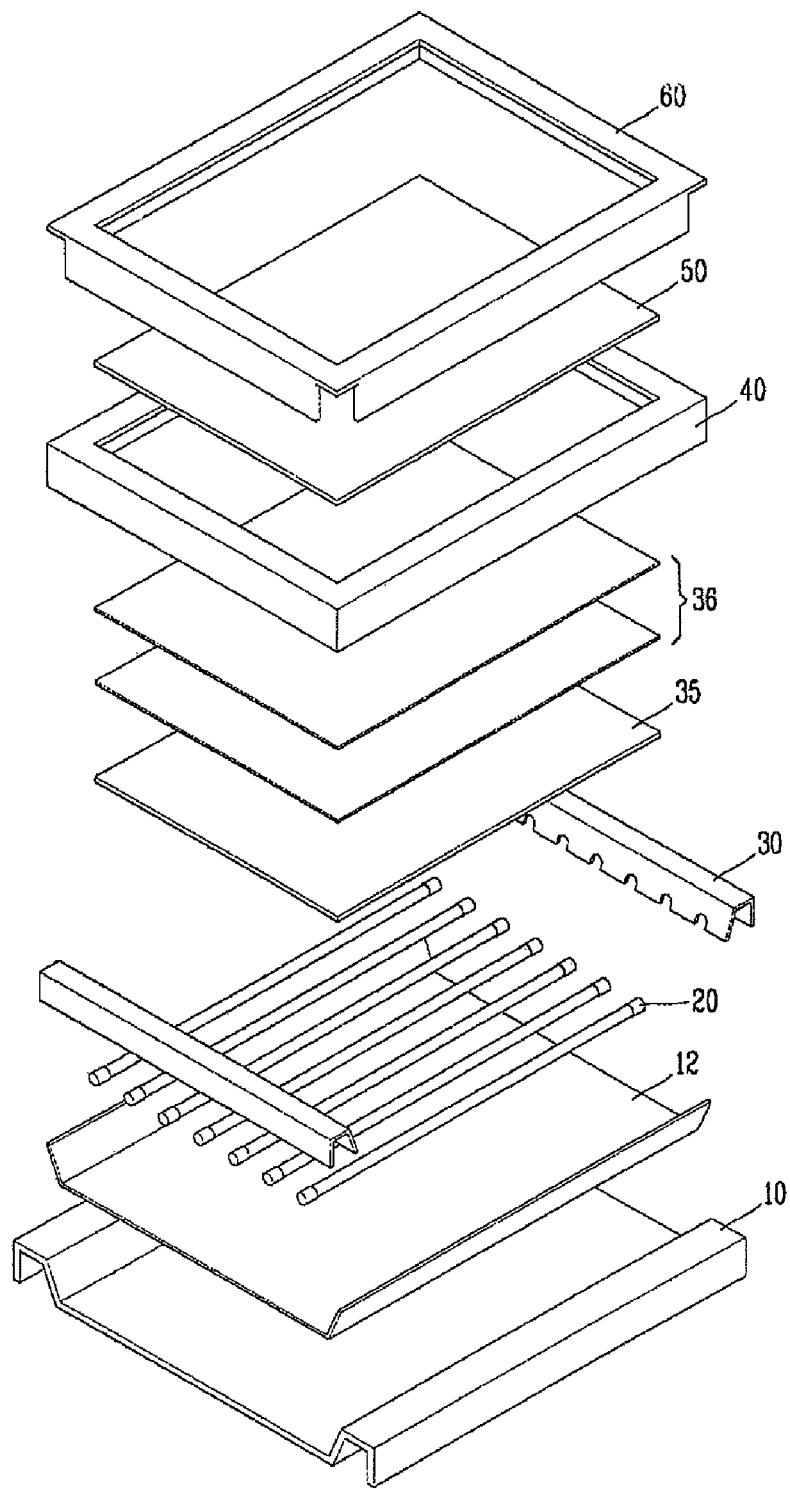
FIG. 1 is an exploded perspective view showing a liquid crystal display (LCD) device in accordance with the conventional art.
Figure 2:
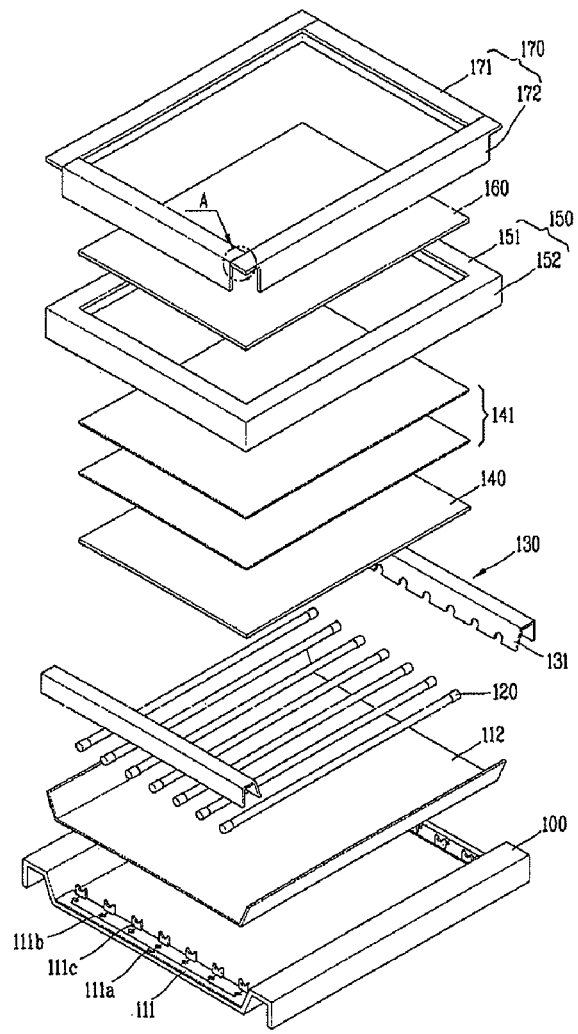
FIG. 2 is an exploded perspective view showing a liquid crystal display (LCD) device according to a first embodiment of the present invention.
Figure 3:
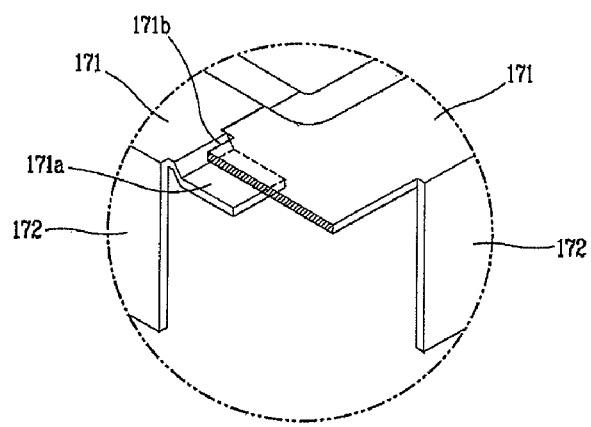
FIG. 3 is an enlarged view showing part 'A' in FIG. 2.
Figure 4:
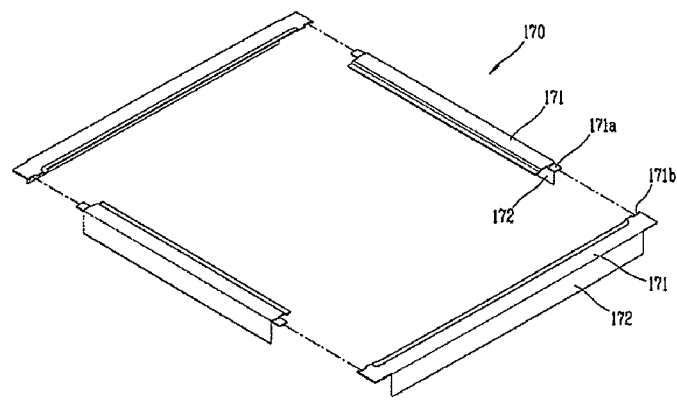
FIG. 4 is an exploded perspective view showing an upper cover of FIG. 2.

FIG. 2 is an exploded perspective view showing a liquid crystal display (LCD) device according to a first embodiment of the present invention, FIG. 3 is an enlarged view showing part 'A' in FIG. 2, and FIG. 4 is an exploded perspective view showing an upper cover of FIG. 2.

Referring to FIGS. 2 to 4, balance PCBs 111 are provided at both sides of a lower cover 100 formed of iron or electrolytic galvanized iron (EGI), etc. Lamp sockets 111c for fixing a plurality of lamps 120 and receiving a high AC voltage from an external inverter are arranged on the balance PCBs 111. In addition, connectors 111a for receiving a voltage from the external inverter and ballast capacitors 111b for uniformly supplying a current to the lamps 120 before a high AC voltage is introduced to the lamp sockets 111c, are formed.

A reflection plate 112 for reflecting light supplied from the lamps 120 to a front surface is attached onto the portion of the lower cover 100 corresponding to a portion between the balance PCBs 111 provided at both sides of the lower cover. The reflection plate 112 is implemented as a film formed of white polyester, or a film onto which a metallic material such as Ag and Al is coated. Here, the reflection plate 112 has reflectivity of about 90~97% for visible rays. The reflectivity is directly proportional to the thickness of a coated film.

The lamps 120 are fixed to the respective lamp sockets 111c on the balance PCBs 111 which are disposed at both sides of the lower cover 100 having the reflection plate 112 attached thereto. Here, one of a Cold Cathode Fluorescent Lamp (CCFL), an External Electrode Fluorescent Lamp (EEFL), or a Hot Cathode Fluorescent Lamp (HCFL) may be used as the lamps 120. However, the CCFL is preferred.

Side supports 130 for protecting the balance PCBs 111 disposed at both sides of the lower cover 100 are provided. Here, the side supports 130 are formed to have the same width as the balance PCBs 111, thereby including the balance PCBs therein. Inclination frames 131 of the side supports 130 contacts a bottom surface of the lower cover 100. Half-circle shaped coupling portions for coupling the lamps 120 are formed with a constant interval on the inclination frames 131.

On the side supports 130 provided at both sides of the lower cover 100, formed are a diffusion plate 140 (or diffusion sheet) for uniformly and forwardly distributing light emitted from the lamps 120 and light reflected through the reflection plate 112, and an optical member 141 for complementing an optical characteristic of light passing through the diffusion plate 140. While the optical member 141 may include the diffusion plate 140, in this embodiment, the optical member 141 includes a prism sheet for enhancing a frontal brightness of light passing through the diffusion plate 140 and a protection sheet disposed above the prism sheet for protecting the prism sheet from external scratch, etc.

A main support 150 for balancing an overall force of the LCD device is coupled to an upper portion of the optical member 141. The main support 150 is formed of synthetic resin or stainless steel having a rectangular frame. An LC panel 160 is laminated on the main support 150. The lamps 120, the side supports 130, and the optical member 141, which are provided on the lower cover 100, are disposed below the main support 150. Here, the main support 150 is composed of a horizontal frame 151 having the LC panel 160 laminated thereon and having a rectangular shape with an opened middle portion, and a vertical frame 152 extending downwardly in a vertical direction from the outer edges of the horizontal frame 151, thereby including a backlight device.

The LC panel 160 laminated on the main support 150 is formed by undergoing many unit processes. That is, the LC panel 160 includes an array substrate, which is a switching device having a thin film transistor at each unit pixel; a color filter substrate having a color filter that represents colors; and an LC injected between the two substrates.

An upper cover 170 is formed of iron or EGI, etc., in the same manner as the lower cover 100. The upper cover 170 is composed of a main frame 171 to cover an upper surface of the main support 150 and the four edges of the LC panel 160 laminated on the main support 150, and a side frame 172 to cover the side surfaces of the main support 150. Here, the upper cover 170 is divisibly formed so as to correspond to long and short edges of the LC panel 160. The upper cover 170 is coupled to the main support 150 by being laminated thereon so that the divided upper covers 170 can contact an upper surface and side surfaces of the main support 150.

Here, protrusion portions 171a are formed at one side and another side of the main frame 171 of the upper cover 170 corresponding to short edges of the LC panel 160. And, insertion portions 171b having insertion grooves for inserting the protrusion portions 171a are formed at one side and another side of the main frame 171 of the upper cover 170 corresponding to long edges of the LC panel 160. Here, the insertion portions 171b may be formed so that parts facing the protrusion portions 171a can be protruding with a convexed shape.

In an alternate configuration, the protrusion portions 171a may be formed at one side and another side of the main frame 171 of the upper cover 170 corresponding to long edges of the LC panel 160. And, the insertion portions 171b having insertion grooves for inserting the protrusion portions 171a may be formed at one side and another side of the main frame 171 of the upper cover 170 corresponding to short edges of the LC panel 160.

In another alternate configuration, the protrusion portions 171a may be formed at one side of the main frame 171 of the upper cover 170 corresponding to long edges and/or short edges of the LC panel 160. And, the insertion portions 171b having insertion grooves for inserting the protrusion portions 171a may be formed at another side of the main frame 171 of the upper cover 170 corresponding to long edges and/or short edges of the LC panel 160.

Furthermore, the protrusion portions 171a and the insertion portions 171b of the upper cover 170 may not be formed of the same material (e.g., iron or EGI) as the main frame 171 and the side frames 172, but may be formed of rubber or poly-based materials.

Accordingly, when the divided upper covers 170 are coupled to other components, the protrusion portions 171a and the insertion portions 171b for inserting the protrusion portions 171a may provide more precise assembly bases to a user (or robot).

However, the division-type upper cover 170 according to a first embodiment of the present invention may have the following problems. When the protrusion portions 171a protruding from one side of the main frame 171 of the upper cover 170 coupled to short edges of the LC panel 160 are inserted into the insertion portions 171b formed at one side of the main frame 171 of the upper cover 170 coupled to long edges of the LC panel 160, the protrusion portions 171a inserted into the insertion portions 171b may be susceptible to an external impact.

Recently, as a bezel corresponding to an outer frame where an image is not substantially displayed is not formed to be long, the protrusion portions 171a of the upper cover 170 are formed to be short. As a result, when an external impact is applied to the protrusion portions 171a, the protrusion portions 171a may be detached from insertion portions 171b, or the upper cover 170 in the long side direction and the upper cover 170 in the short side direction may be separated from each other.

Accordingly, the corner regions of the upper cover 170 become free from an interfered structure, thereby creating a distortion phenomenon when an external impact is applied thereto. This may cause the LC panel to be bent, thereby causing uneven brightness at the time of displaying an image.

Hereinafter, an LCD device according to a second embodiment to solve the problems will be explained.

Figure 5:
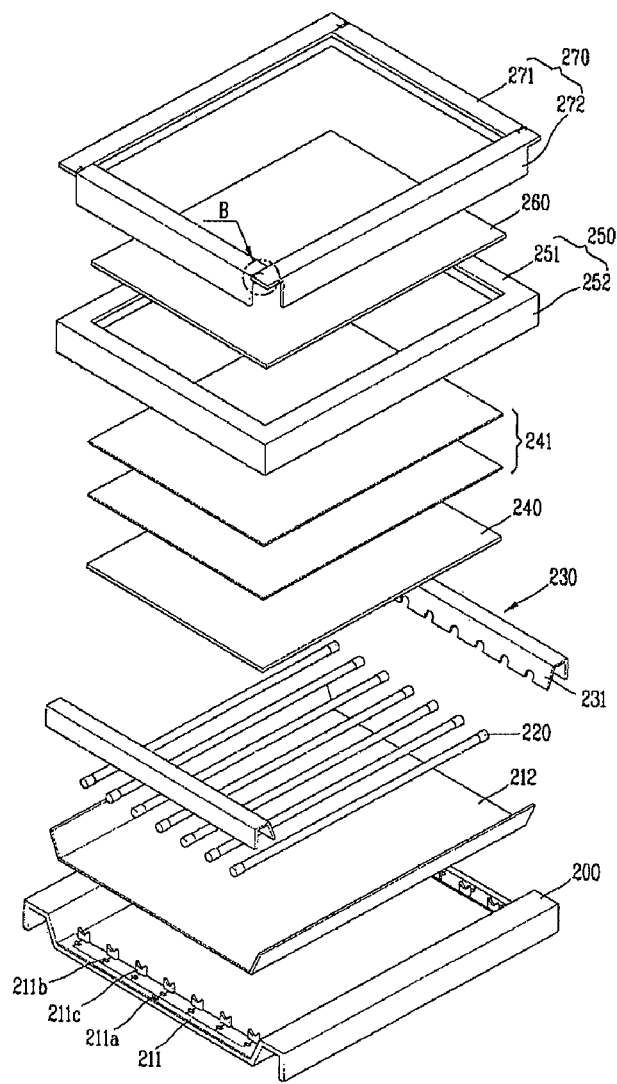
FIG. 5 is an exploded perspective view showing a liquid crystal display (LCD) device according to a second embodiment of the present invention.
Figure 6:
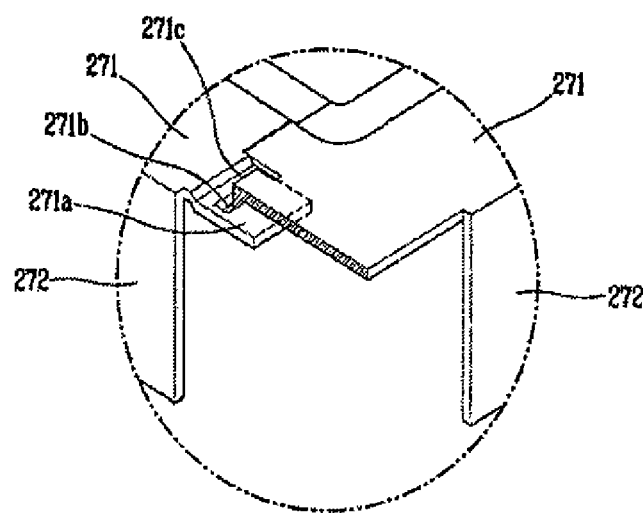
FIG. 6 is an enlarged view showing part 'B' in FIG. 5.
Figure 7:
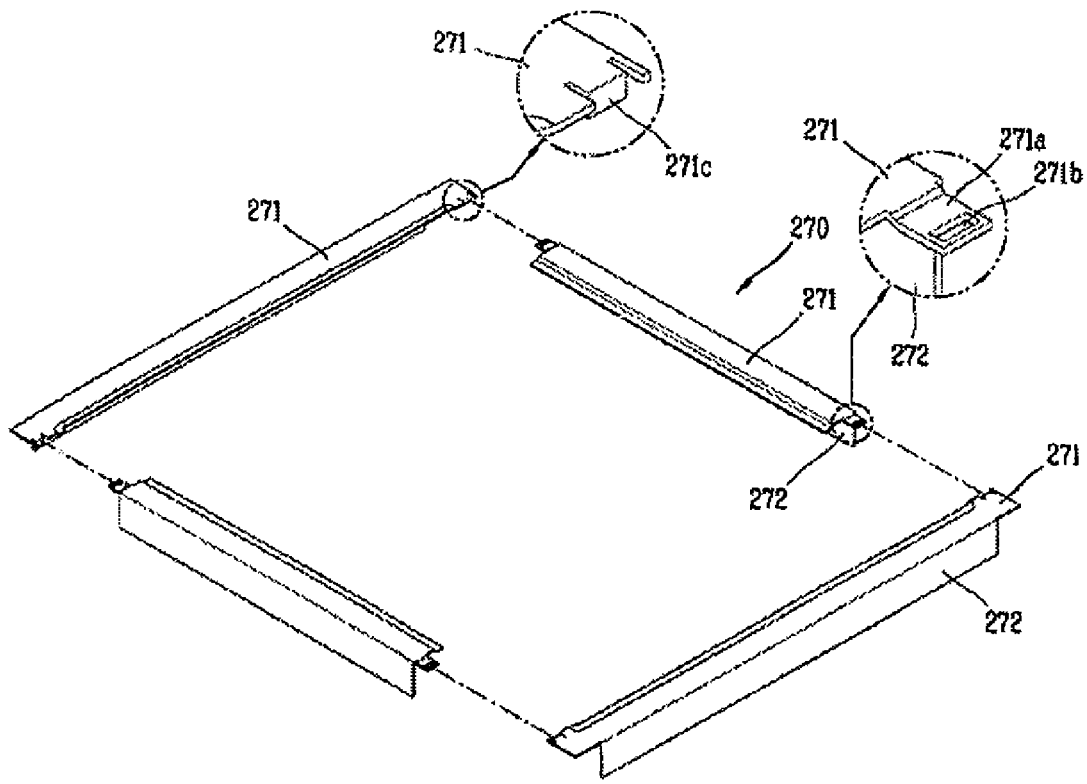
FIG. 7 is an exploded perspective view showing an upper cover of FIG. 5.

FIG. 5 is an exploded perspective view showing a liquid crystal display (LCD) device according to a second embodiment of the present invention, FIG. 6 is an enlarged view showing a part of 'B' in FIG. 5, and FIG. 7 is an exploded perspective view showing an upper cover of FIG. 5.

Referring to FIGS. 5 to 7, the LCD device according to a second embodiment of the present invention comprises a main support 250 having a rectangular shape with an opened middle portion; an LC panel 260 laminated on the main support 250; and an upper cover 270 consisting of a main frame 271 coupled to edges of the LC panel 260 and an upper surface of the main support 250, and a side frame 272 coupled to side surfaces of the main support 250, the upper cover 270 divided into a plurality of parts corresponding to long edges and short edges of the LC panel 260. The upper cover 270 is provided with coupling means 271a, 271b, and 271c adjacently formed at corners of the main support 250, and serving to couple the main support 250 to the main frame 271.

Here, the coupling means 271a, 271b, and 271c comprise a protrusion portion 271a which protrudes from one side of one main frame 271 and includes a through hole 271b; and an insertion portion 271c formed at one side of another main frame 271, and inserted into the through hole 271b of the protrusion portion 271a. Here, the insertion portion 271c is preferably formed to have a hook shape such as '¬'.

Balance PCBs 211 are provided at both sides of a lower cover 200, formed of iron or electrolytic galvanized iron (EGI), etc. Lamp sockets 211c for fixing a plurality of lamps 220 and receiving a high AC voltage from an external inverter are arranged on the balance PCBs 211. Also, connectors 211a for receiving a voltage from the external inverter and ballast capacitors 211b for uniformly supplying a current to the lamps 220 before a high AC voltage is introduced to the lamp sockets 211c are formed on the balance PCBs 211.

A reflection plate 212 for reflecting light supplied from the lamps 220 to a front surface is attached onto the lower cover 200 corresponding to a portion between the balance PCBs 211 disposed at both sides of the lower cover. The reflection plate 212 is implemented as a film formed of white polyester, or a film onto which a metallic material such as Ag and Al is coated. Here, the reflection plate 212 has reflectivity of about 90~97% for visible rays. The reflectivity is directly proportional to the thickness of a coated film. The lamps 220 are fixed to the respective lamp sockets 211c on the balance PCBs 111 which are disposed at both sides of the lower cover 100 having the reflection plate 112 attached thereto. Here, one of a Cold Cathode Fluorescent Lamp (CCFL), an External Electrode Fluorescent Lamp (EEFL), and a Hot Cathode Fluorescent Lamp (HCFL) may be used as the lamps 220. However, the CCFL is preferably used.

Side supports 230 for protecting the balance PCBs 211 disposed at both sides of the lower cover 200 are provided. Here, the side supports 230 are formed to have the same width as the balance PCBs 211, thereby including the balance PCBs 211 therein. Inclination frames 231 of the side supports 130 contact a bottom surface of the lower cover 100. Half circle-shaped coupling portions for coupling the lamps 220 are formed with a constant interval on inclination frames 231. On the side supports 230 provided at both sides of the lower cover 200, formed are a diffusion plate 240 for uniformly and forwardly distributing light emitted from the lamps 220 and light reflected through the reflection plate 212, and an optical member 241 for complementing an optical characteristic of light passing through the diffusion plate 240. While the optical member 241 may include the diffusion plate 240, in this embodiment, the optical member 241 includes a prism sheet and a protection sheet as aforementioned in the first embodiment of the present invention.

A main support 250 for balancing an overall force of the LCD device is coupled to an upper portion of the optical member 241. The main support 250 is formed of synthetic resin or stainless steel having a rectangular frame. An LC panel 260 is laminated on the main support 250. The lamps 220, the side supports 230, and the optical member 241 provided on the lower cover 200 are disposed below the main support 250. Here, the main support 250 is composed of a horizontal frame 251 having the LC panel 260 laminated thereon and having a rectangular shape with an opened middle portion, and a vertical frame 252 extending downwardly in a vertical direction from the outer edges of the horizontal frame 251.

The LC panel 260 laminated on the main support 250 is formed by undergoing many unit processes. That is, the LC panel 260 includes an array substrate, which is a switching device having a thin film transistor at each unit pixel; a color filter substrate having a color filter that represents colors; and an LC injected between the two substrates.

The upper cover 270 is formed of iron or EGI, etc. in the same manner as the lower cover 200. The upper cover 270 is composed of a main frame 271 to cover an upper surface of the main support 250 including four edges of the LC panel 260 laminated on the main support 250; and a side frame 272 to cover side surfaces of the main support 250. Here, the upper cover 270 is divisibly formed so as to correspond to long and short edges of the LC panel 260. The upper cover 270 is coupled to the main support 250 by being laminated thereon so that the divided upper covers 270 can contact an upper surface and side surfaces of the main support 250.

Hereinafter, the division-type upper cover 270 will be explained in more detail.

The upper cover 270 according to the second embodiment of the present invention is implemented as four divided upper covers 270 so as to correspond to short edges and long edges of the LC panel 260 or the main support 250. Here, each of the divided upper covers 270 is composed of a main frame 271 to cover an upper surface of the main support 250 and edges of the LC panel 260; and a side frame 272 vertically extending from one end of the main frame 271, and covering side surfaces of the main support 250.

Here, the insertion portions 271c, implemented as male hooks and downwardly bent from corner regions of the main support 250 in a vertical direction, are formed at both sides of the main frame 271 of the upper cover 270 corresponding to long edges. And, the protrusion portions 271a including female through holes 271b are formed at both sides of the main frame 271 of the upper cover 270 corresponding to short edges, thereby being coupled to the insertion portions 271c.

Here, the protrusion portions 271a are protruding from the main frame 271 of the upper cover 270

Accordingly, the upper cover 270 having the protrusion portions 271a including the female through holes 271b is laminated on to the short edges of the LC panel 260 and the main support 250. Then, the insertion portions 271c implemented as male hooks are inserted into the female through holes 271b, coupling the upper cover 270 to the long edges of the LC panel 260 and the main support 250.

In the LCD device according to the second embodiment of the present invention, it is also possible to form the protrusion portions 271a including the female through holes 271b at both sides of the main frame 271 of the upper cover 270 corresponding to long edges of the LC panel 260, so as to couple to the insertion portions 271c implemented as male hooks. And, it is also possible to form the insertion portions 271c, implemented as male hooks and downwardly bent from corners of the main support 250 in a vertical direction, at both sides of the main frame 271 of the upper cover 270 corresponding to short edges of the LC panel 260.

In the LCD device according to the second embodiment of the present invention, it is also possible to form the insertion portions 271c, implemented as male hooks and downwardly bent from corners of the main support 250 in a vertical direction, at one side of the main frame 271 of the upper cover 270 corresponding to long edges and/or short edges of the LC panel 260. It is also possible to form the protrusion portions 271a including the female through holes 271b at another side of the main frame 271 of the upper cover 270 corresponding to long edges and/or short edges of the LC panel 260, so as to couple to the insertion portions 271c implemented as male hooks.

The insertion portions 271c implemented as male hooks of the upper cover 270 and/or the protrusion portions 271a including the female through holes 271b coupled to the insertion portions 271c, may be formed of rubber or poly-based materials, rather than the same material (iron or EGI) as the main frame 271 and the side frame 272.

Under these configurations, when an external impact is applied to the LCD device, or force is applied toward the same direction from one corner and another corner positioned in a diagonal direction, the insertion portions 271c implemented as male hooks are restricted by the female through holes 271b of the protrusion portions 271a of the upper cover 270. Accordingly, the entire distortion of the LCD device according to the second embodiment may become more attenuated than that of the LCD device according to the first embodiment.

Referring to FIGS. 6 and 7, the method for fabricating the upper cover will be explained.

Firstly, four frameworks or plates having a rectangular shape are prepared in a pressing manner using a metallic pattern of a certain shape. Here, two frames corresponding to long edges of the LC panel and the main support, and two frames corresponding to short edges of the LC panel and the main support are formed to be symmetrical to each other. Here, the entire width of the frame is calculated based on each width of the main frame 271 and the side frame 272 of the upper cover 270, which will be formed through the subsequent bending process.

Two pairs of frames, each frame of the pair being symmetrical to another, undergo a cutting or piercing operation. On the one pair of frames corresponding to short edges of the LC panel, the protrusion portions 271a and the through holes 271b are formed. On the another pair of frames corresponding to long edges of the LC panel, the insertion portions 271c implemented as male hooks are formed.

Next, a first bending process to vertically bend the main frame 271 and the side frame 272 along each bending line of the four frames may be performed.

Subsequently, a second bending process to form the insertion portions 271c, implemented as male hooks and formed at both sides of the pair of frames corresponding to long edges of the LC panel, may be performed.

Here, the second bending process may be simultaneously performed with the first bending process.

In the LCD device of the present invention, material costs may be considerably reduced due to the upper cover being divided into a plurality of parts. Furthermore, when the divided upper covers are assembled to other components, operation efficiency is enhanced due to a structural basis for assembly, thereby reducing the entire cost.

Furthermore, as distortion of the LCD device occurring at each corner is attenuated, the LC panel is prevented from being bent, thereby implementing a uniform brightness and enhancing an image quality.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A liquid crystal display (LCD) device, comprising:
a main support having a rectangular shape with an opened middle portion;
an LC panel laminated on the main support; and
an upper cover divided into a plurality of parts, and coupled to the main support and the LC panel in correspondence to long and short edges of the LC panel,
wherein the upper cover comprises a main frame coupled to edges of the LC panel and an upper surface of the main support, and a side frame coupled to side surfaces of the main support,
wherein the upper cover is provided with coupling means adjacently formed at corners of the main support, and serving to couple the main support to the main frame,
wherein the coupling means of the upper cover comprise:
an insertion portion implemented as male ring and downwardly bent from corner of the main support in a vertical direction are formed at both sides of the main frame of the upper cover corresponding to long edge; and
a protrusion portion including female through hole are formed at both sides of the main frame of the upper cover corresponding to short edge, thereby coupled to the insertion portion, wherein the insertion portion implemented as male rings are inserted into the female through hole.

2. The LCD device of claim 1, wherein the coupling means of the upper cover comprise:
   a protrusion portion protruding from one side of one main frame; and
   an insertion portion formed at one side of another main frame and receiving the protrusion portion.

3. The LCD device of claim 1, wherein the insertion portion inserted into the through hole of the protrusion portion has a shape of "¬".

4. The LCD device of claim 1, wherein the insertion portion and the protrusion portion are formed of rubber or poly-based materials.

* * * * *

UNITED STATES PATENT AND TRADEMARK OFFICE
CERTIFICATE OF CORRECTION

| | |
|---|---|
| PATENT NO. | : 8,049,832 B2 |
| APPLICATION NO. | : 12/343050 |
| DATED | : November 1, 2011 |
| INVENTOR(S) | : Jae-Lyang Kim |

It is certified that error appears in the above-identified patent and that said Letters Patent is hereby corrected as shown below:

In the Claims

In column 8, claim 1, line 66, after "short edge, thereby" insert --being--.

Signed and Sealed this
Sixth Day of March, 2012

David J. Kappos
*Director of the United States Patent and Trademark Office*